United States Patent
Krueger et al.

(10) Patent No.: US 8,788,144 B2
(45) Date of Patent: Jul. 22, 2014

(54) BRAKING TORQUE ADJUSTMENTS BASED ON WHEEL SLIP

(75) Inventors: Eric E. Krueger, Chelsea, MI (US); Kevin S. Kidston, New Hudson, MI (US); Eric J. Holdorf, Warren, MI (US); Mahir Hodzic, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1056 days.

(21) Appl. No.: 12/627,604

(22) Filed: Nov. 30, 2009

(65) Prior Publication Data
US 2011/0130937 A1    Jun. 2, 2011

(51) Int. Cl.
| | | |
|---|---|---|
| G06F 17/00 | (2006.01) |
| G06F 19/00 | (2011.01) |
| B60K 6/20 | (2007.10) |
| B60K 6/52 | (2007.10) |
| B60T 8/32 | (2006.01) |
| B60T 8/62 | (2006.01) |

(52) U.S. Cl.
USPC .......... 701/36; 701/48; 701/71; 701/81; 701/82; 303/139; 303/153; 180/65.265; 180/65.285

(58) Field of Classification Search
USPC .......... 701/22, 36, 48, 69, 70, 71, 78, 81, 82; 303/3, 146, 147, 121, 138, 139, 142, 303/143, 152; 180/65.21, 65.265, 65.28, 180/65.285, 197
See application file for complete search history.

(56) References Cited

U.S. PATENT DOCUMENTS

| | | | |
|---|---|---|---|
| 6,709,075 B1 * | 3/2004 | Crombez et al. | 303/152 |
| 7,104,617 B2 * | 9/2006 | Brown | 303/152 |
| 7,654,620 B2 * | 2/2010 | Jeon et al. | 303/152 |
| 2005/0029863 A1 * | 2/2005 | Brown et al. | 303/146 |
| 2005/0103551 A1 * | 5/2005 | Matsuno | 180/243 |
| 2007/0038340 A1 * | 2/2007 | Sekiguchi et al. | 701/22 |
| 2007/0108838 A1 * | 5/2007 | Shaffer et al. | 303/152 |
| 2008/0100129 A1 * | 5/2008 | Lubbers | 303/113.1 |
| 2008/0100132 A1 * | 5/2008 | Jeon et al. | 303/152 |
| 2008/0228368 A1 * | 9/2008 | Fuhrer et al. | 701/81 |
| 2009/0115246 A1 * | 5/2009 | Yanagida et al. | 303/144 |
| 2010/0113215 A1 * | 5/2010 | Jager et al. | 477/29 |
| 2010/0117567 A1 * | 5/2010 | Jeon et al. | 318/376 |

\* cited by examiner

Primary Examiner — Thomas Tarcza
Assistant Examiner — Edward Pipala
(74) Attorney, Agent, or Firm — Ingrassia Fisher & Lorenz, P.C.

(57) ABSTRACT

A method for adjusting braking in a vehicle having wheels and a regenerative braking system is provided. The method comprises the steps of providing regenerative braking torque for the vehicle via the regenerative braking system at a first level if a wheel slip of the vehicle is not present, and providing regenerative braking torque for the vehicle via the regenerative braking system at one of a plurality of modulated levels if the wheel slip is present. Each of the plurality of modulated levels is dependent on a magnitude, a location, or both, of the wheel slip. Each of the modulated levels is less than the first level.

18 Claims, 2 Drawing Sheets

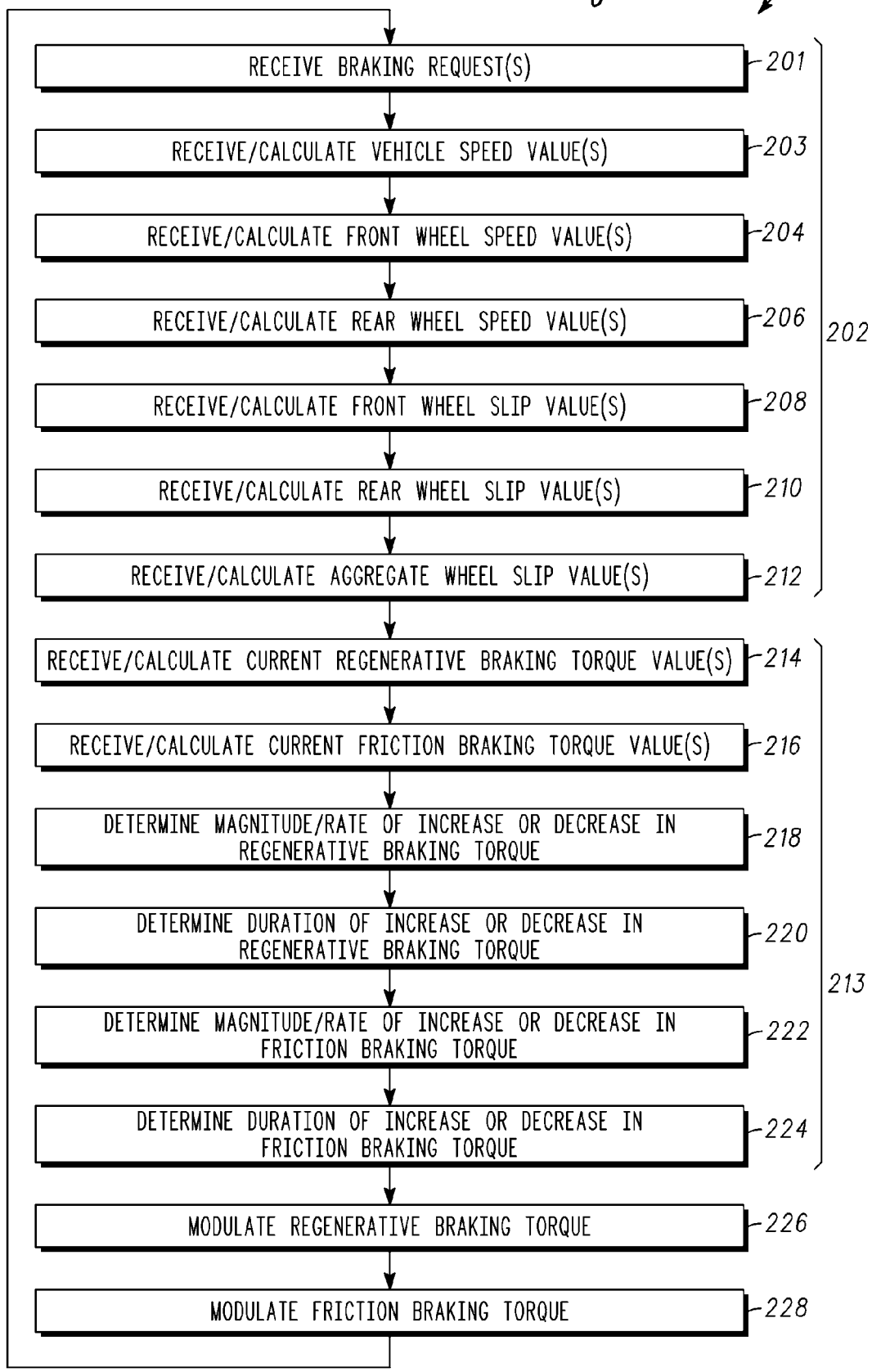

BRAKING TORQUE ADJUSTMENTS BASED ON WHEEL SLIP

TECHNICAL FIELD

The present invention generally relates to the field of vehicles and, more specifically, to methods and systems for adjusting braking torque in vehicles.

BACKGROUND OF THE INVENTION

Automobiles and various other vehicles include braking systems for reducing vehicle speed or bringing the vehicle to a stop. Such braking systems generally include a controller that provides braking pressure to braking calipers on one or both axles of the vehicle to produce braking torque for the vehicle. For example, in a regenerative braking system, hydraulic or other braking pressure is generally provided for both a non-regenerative braking axle and a regenerative braking axle. Traditional braking systems may disable regenerative braking systems when wheel slip is possible. However, in certain situations, complete disabling of regenerative braking may not be ideal.

Accordingly, it is desirable to provide an improved method for controlling braking for a vehicle that provides for improved control of braking torque, for example regenerative braking torque, when wheel slip is present. It is also desirable to provide an improved system for such controlling braking for a vehicle that provides for improved control of braking torque, for example regenerative braking torque, when wheel slip is present. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for adjusting braking in a vehicle having wheels and a regenerative braking system is provided. The method comprises the steps of providing regenerative braking torque for the vehicle via the regenerative braking system at a first level if a wheel slip of the vehicle is not present, and providing regenerative braking torque for the vehicle via the regenerative braking system at one of a plurality of modulated levels if the wheel slip is present. Each of the plurality of modulated levels is dependent on a magnitude, a location, or both, of the wheel slip. Each of the modulated levels is less than the first level.

In accordance with another exemplary embodiment of the present invention, a method for adjusting braking in a vehicle having wheels and a regenerative braking system is provided. The method comprises the steps of reducing regenerative braking torque for the vehicle via the regenerative braking system at a first rate of reduction if a wheel slip of the vehicle is present and a magnitude of the wheel slip is less than a predetermined threshold, and reducing regenerative braking torque for the vehicle via the regenerative braking system at a second rate of reduction if the wheel slip is present and the magnitude of the wheel slip is greater than the predetermined threshold, the second rate being greater than the first rate.

In accordance with a further exemplary embodiment of the present invention, a system for adjusting braking in a vehicle having a plurality of wheels and a regenerative braking system is provided. The system comprises one or more sensors and a processor. The one or more sensors are configured to measure wheel speeds from one or more of the plurality of wheels. The processor is coupled to the one or more sensors, and is configured to determine whether wheel slip is present using the wheel speeds, and cause the regenerative braking system to provide regenerative braking torque for the vehicle: at a first level if the wheel slip is not present, and at one of a plurality of modulated levels if the wheel slip is present, each of the plurality of modulated levels being dependent on a magnitude, a location, or both, of the wheel slip. Each of the plurality of modulated levels being less than the first level.

BRIEF DESCRIPTION OF THE DRAWINGS

The present invention will hereinafter be described in conjunction with the following drawing figures, wherein like numerals denote like elements, and wherein:

FIG. 2 is a flowchart of a process for controlling braking and for adjusting braking pressure in a vehicle, such as an automobile, and that can be utilized in connection with the braking system of FIG. 1, in accordance with an exemplary embodiment of the present invention.

DETAILED DESCRIPTION OF THE INVENTION

Figure 1:
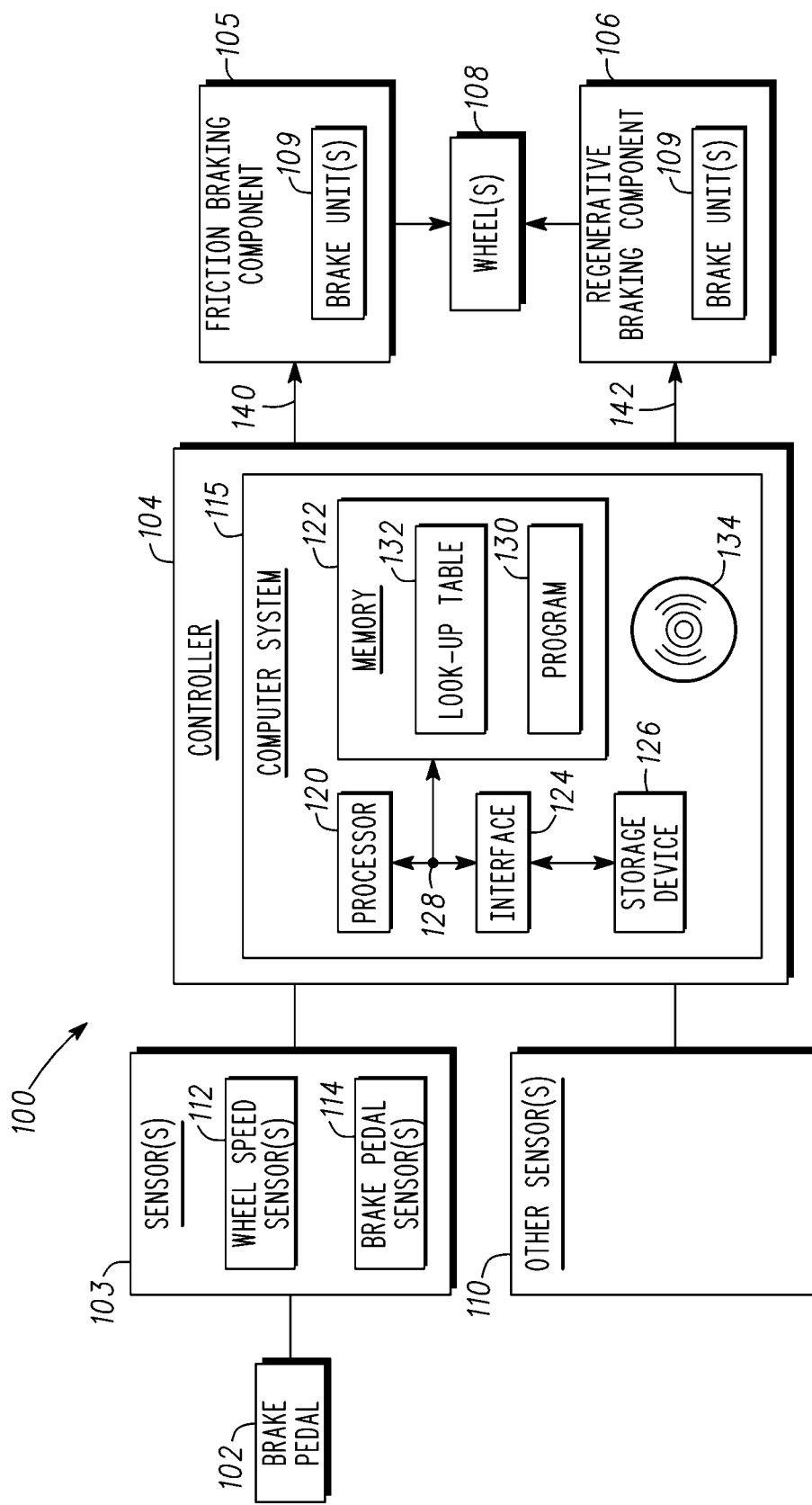
FIG. 1 is a functional block diagram of a braking system for a vehicle, such as an automobile, in accordance with an exemplary embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 is a block diagram of an exemplary braking system 100 for use in a brake-by-wire system of a vehicle, such as an automobile. In a preferred embodiment, the vehicle comprises an automobile, such as a sedan, a sport utility vehicle, a van, or a truck. However, the type of vehicle may vary in different embodiments of the present invention.

As depicted in FIG. 1, the braking system 100 includes a brake pedal 102, one or more sensors 103, a controller 104, a friction braking component 105, and a regenerative braking component 106. In certain embodiments, the braking system 100 may include and/or be coupled to one or more other modules 110, for example a global positioning system (GPS) device and/or one or more other modules that provide measurements or information to the controller 104, for example regarding one or positions, speeds, and/or other values pertaining to the vehicle and/or components thereof. The braking system 100 is used in connection with a first axle 140 and a second axle 142. Each of the first and second axles 140, 142 has one or more wheels 108 of the vehicle disposed thereon.

The friction braking component 105 and the regenerative braking component each have respective brake units 109. Certain of the brake units 109 are disposed along a first axle 140 of the vehicle along with certain of the wheels 108, and certain other of the brake units 109 are disposed along a second axle 142 of the vehicle along with certain other of the wheels 108. In a preferred embodiment, the first axle 140 is a non-regenerative braking axle coupled to the friction braking component 105, and the second axle 142 is a regenerative braking axle 142 coupled to the regenerative braking component 106.

The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system. In another preferred embodiment, the braking system 100 is a hydraulic system.

The one or more sensors 103 include one or more wheel speed sensors 112 and one or more brake pedal sensors 114. The wheel speed sensors 112 are coupled to one or more of the wheels 108, and measure one or more speeds thereof. These measurements and/or information thereto are provided to the controller 104 for processing and for calculation of wheel slip of one or more of the wheels 108.

The brake pedal sensors 114 are coupled between the brake pedal 102 and the controller 104. Specifically, in accordance with various preferred embodiments, the brake pedal sensors 114 preferably include one or more brake pedal force sensors and/or one or more brake pedal travel sensors. The number of brake pedal sensors 114 may vary. For example, in certain embodiments, the braking system 100 may include a single brake pedal sensor 114. In various other embodiments, the braking system 100 may include any number of brake pedal sensors 114.

The brake pedal travel sensors, if any, of the brake pedal sensors 114 provide an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved.

The brake pedal force sensors, if any, of the brake pedal sensors 114 determine how much force the operator of braking system 100 is applying to the brake pedal 102, which is also known as brake pedal force. In one exemplary embodiment, such a brake pedal force sensor, if any, may include a hydraulic pressure emulator and/or a pressure transducer, and the brake pedal force can be determined by measuring hydraulic pressure in a master cylinder of the braking system 100.

Regardless of the particular types of brake pedal sensors 114, the brake pedal sensors 114 detect one or more values (such as brake pedal travel and/or brake pedal force) pertaining to the drivers' engagement of the brake pedal 102. The brake pedal sensors 114 also provide signals or information pertaining to the detected values pertaining to the driver's engagement of the brake pedal 102 to the computer system 115 for processing by the computer system 115.

The controller 104 is coupled between the sensors 103 (and, in some cases, the other modules 110), and the friction and regenerative braking components 105, 106 (and the respective brake units 109 thereof) and the first and second axles 140, 142. Specifically, the controller 104 monitors the driver's engagement of the brake pedal 102 and the measurements from the sensors 103 (and, in some cases, information provided by the other modules 110), provides various calculations and determinations pertaining thereto, and controls braking of the vehicle and adjusts braking torque via braking commands sent to the brake units 109 by the controller 104 along the first and second axles 140, 142.

In the depicted embodiment, the controller 104 comprises a computer system 115. In certain embodiments, the controller 104 may also include one or more of the sensors 103, among other possible variations. In addition, it will be appreciated that the controller 104 may otherwise differ from the embodiment depicted in FIG. 1, for example in that the controller 104 may be coupled to or may otherwise utilize one or more remote computer systems and/or other control systems.

In the depicted embodiment, the computer system 115 is coupled between the brake pedal sensors 114, the brake units 109, and the first and second axles 140, 142. The computer system 115 receives the signals or information from the various sensors 103 and the other modules 110, if any, and further processes these signals or information in order to control braking of the vehicle and apply appropriate amounts of braking torque or pressure to the friction braking component 105 and the regenerative braking component 106 along the first axle 140 and the second axle 142, respectively, via braking commands sent to the brake units 109 by the computer system 115 based at least in part on a wheel slip of the vehicle. In a preferred embodiment, these and other steps are conducted in accordance with the process 200 depicted in FIG. 2 and described further below in connection therewith.

In the depicted embodiment, the computer system 115 includes a processor 120, a memory 122, an interface 124, a storage device 126, and a bus 128. The processor 120 performs the computation and control functions of the computer system 115 and the controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 130 contained within the memory 122 and, as such, controls the general operation of the controller 104 and the computer system 115, preferably in executing the steps of the processes described herein, such as the process 200 depicted in FIG. 2 and described further below in connection therewith.

The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 128 serves to transmit programs, data, status and other information or signals between the various components of the computer system 115. In a preferred embodiment, the memory 122 stores the above-referenced program 130 along with one or more look-up tables 132 that are used in controlling the braking and adjusting braking torque in accordance with steps of the process 200 depicted in FIG. 2 and described further below in connection therewith.

The interface 124 allows communication to the computer system 115, for example from a system driver and/or another computer system, and can be implemented using any suitable method and apparatus. It can include one or more network interfaces to communicate with other systems or components. The interface 124 may also include one or more network interfaces to communicate with technicians, and/or one or more storage interfaces to connect to storage apparatuses, such as the storage device 126.

The storage device 126 can be any suitable type of storage apparatus, including direct access storage devices such as hard disk drives, flash systems, floppy disk drives and optical disk drives. In one exemplary embodiment, the storage device 126 comprises a program product from which memory 122 can receive a program 130 that executes one or more embodiments of one or more processes of the present invention, such as the process 200 of FIG. 2 or portions thereof. In another exemplary embodiment, the program product may be directly stored in and/or otherwise accessed by the memory 122 and/or a disk (e.g. disk 134), such as that referenced below.

The bus 128 can be any suitable physical or logical means of connecting computer systems and components. This includes, but is not limited to, direct hard-wired connections, fiber optics, infrared and wireless bus technologies. During operation, the program 130 is stored in the memory 122 and executed by the processor 120.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 115 may also otherwise differ from the embodiment depicted in FIG. 1, for example in that the computer system 115 may be coupled to or may otherwise utilize one or more remote computer systems and/or other control systems.

The brake units 109 are coupled between the controller 104 and the wheels 108. In the depicted embodiment, the brake units 109 are disposed along the first axle 140 and are coupled to certain wheels 108 on the first axle 140, and other of the brake units 109 are disposed along the second axle 142 and are coupled to other wheels of the second axle 142. The brake units 109 receive the braking commands from the controller 104, and are controlled thereby accordingly.

The brake units 109 can include any number of different types of devices that, upon receipt of braking commands, can apply the proper braking torque as received from the controller 104. For example, in an electro-hydraulic system, the brake units 109 can comprise an actuator that can generate hydraulic pressure that can cause brake calipers to be applied to a brake disk to induce friction to stop a vehicle. Alternatively, in an electro-mechanical brake-by-wire system, the brake units 109 can comprise a wheel torque-generating device that operates as a vehicle brake. The brake units 109 can also be regenerative braking devices, in which case the brake units 109, when applied, at least facilitate conversion of kinetic energy into electrical energy.

FIG. 2 is a flowchart of a process 200 for adjusting braking torque and controlling braking in a vehicle and for adjusting braking torque for a vehicle, in accordance with an exemplary embodiment of the present invention. The process 200 can be implemented in connection with the braking system 100 of FIG. 1, the controller 104, and/or the computer system 115 of FIG. 1, in accordance with an exemplary embodiment of the present invention.

As depicted in FIG. 2, the process 200 begins with the step of receiving one or more braking requests (step 201). The braking requests preferably pertain to values pertaining to engagement of the brake pedal 102 by a driver of the vehicle. In certain preferred embodiment, the braking requests pertain to values of brake pedal travel and/or brake pedal force as obtained by the brake pedal sensors 114 of FIG. 1 and provided to the computer system 115 of FIG. 1. Also in a preferred embodiment, the braking requests are received and obtained, preferably continually, at different points or periods in time throughout a braking event for the vehicle.

In addition, one or more wheel slip values are received, measured, determined, or calculated, as referenced in the combined step 202 of FIG. 2. The number of wheel slip values, the types of wheel slip values, and the methods of receiving, measuring, determining, and/or calculating the wheel slip values may vary in different embodiments.

As depicted in FIG. 2, in certain embodiments vehicle speed values are received or calculated (step 203), preferably via the wheel speed sensors 112, the other modules 110 (e.g., a GPS device), and/or the processor 120 of FIG. 1. Also in certain embodiments, front wheel speed values (step 204) and/or rear wheel speed values (step 206) are obtained, preferably via the wheel speed sensors 112 and/or the processor 120 of FIG. 1. The vehicle speed values, front wheel speed values, and/or rear wheel speed values of steps 203, 204, and 206, respectively, are then used in certain embodiments to calculate front wheel slip values (step 208), rear wheel slip values (step 210), and/or aggregate wheel slip values (step 212). In certain preferred embodiments, such calculations are made by the processor 120 of FIG. 1. In addition, in certain embodiments, a subset of these or related values may be utilized and/or calculated.

Alternatively, in certain embodiments, some or all of such values (or a subset thereof) may be received or obtained by the controller 104 (preferably, via the interface 124 and/or the processor 120 thereof) from the other modules 110 (e.g., from an existing system in the vehicle that already calculates such values) and/or from one or more other sources. For example, in certain embodiments, the controller 104 may obtain or receive front wheel slip values (step 208), rear wheel slip values (step 210), and/or aggregate wheel slip values (step 212) from such other modules 110.

Next, one or more desired adjustments to braking torque for the vehicle are determined, as referenced in the combined step 213 of FIG. 2. As set forth in greater detail below, in certain embodiments, the desired adjustments comprise desired changes in braking torque or pressure for the brake units 109 of the regenerative braking component 106 along the second axle 142 of FIG. 1. In addition, also as set forth in greater detail below, in certain embodiments, the desired adjustments may also comprise desired changes in braking torque or pressure for the brake units 109 of the friction braking component 105 along the first axle 140 of FIG. 1.

In the depicted embodiment, the combined step 213 first includes the steps of receiving or calculating current values of regenerative braking torque (step 214) and friction braking torque (step 216). In one exemplary embodiment, the current value of regenerative braking torque pertains to a current or most recent level of braking torque provided by or braking pressure provided to the regenerative braking component 106 of FIG. 1 via the second axle 142 of FIG. 1. Also in an exemplary embodiment, the current value of friction braking torque pertains to a current or most recent level of braking torque provided by or braking pressure provided to the friction braking component 105 of FIG. 1 via the first axle 140 of FIG. 1.

In a preferred embodiment, the current values of regenerative braking torque and friction braking torque, and the braking request of step 201, are used in conjunction with the wheel slip values of the combined step 202 in determining or calculating the adjustments to the regenerative and/or friction braking torque. In addition, in one preferred embodiment, the current values of regenerative braking torque and friction torque are preferably known or determined by the processor 120 of FIG. 1.

Next, a desired magnitude or rate of change of regenerative braking torque is determined (step 218). In a preferred embodiment, during step 218, the desired magnitude or rate of change is determined by the processor 120 of FIG. 1 with respect to the braking torque for or braking pressure applied to the brake units 109 of the regenerative braking component 106 of FIG. 1 via the second axle 142 of FIG. 1. In addition, in certain embodiments, a duration of the desired magnitude or rate of change of regenerative braking torque is similarly determined (step 220), preferably also by the processor 120 of FIG. 1.

In one preferred embodiment, the desired magnitude or rate of change in regenerative braking torque of step 218 and/or the duration thereof of step 220 are inversely related to the magnitude of the wheel slip of the combined step 202. For example, if the magnitude of the wheel slip is relatively small or has increased in a relatively small manner (i.e., less than a predetermined threshold, such as if the vehicle is travelling over a pothole), then a relatively small desired magnitude or rate of decrease in the regenerative braking torque (and/or a relatively smaller duration of regenerative braking torque decrease) are preferably determined. Similarly, if the wheel slip has slightly decreased in a current iteration (e.g. if the vehicle is starting to emerge from a pothole), then a relatively small desired magnitude or rate of increase in the regenerative braking torque (and/or a relatively smaller duration of regenerative braking torque increase) are preferably determined.

Conversely, if the magnitude of the wheel slip is relatively large or has increased in a relatively large manner (i.e., greater than the predetermined threshold, such as if the vehicle is travelling over ice), then a relatively large desired magnitude or rate of decrease in the regenerative braking torque (and/or a relatively larger duration of regenerative braking torque decrease) are preferably determined. Similarly, if the wheel slip has significantly decreased in a current iteration (e.g. if the vehicle has emerged out of previous icy road conditions), then a relatively large desired magnitude or rate of increase in the regenerative braking torque (and/or a relatively larger duration of regenerative braking torque increase) are preferably determined.

In one preferred embodiment, the desired magnitude or rate of change in regenerative braking torque (and/or duration thereof) is related to the magnitude of the wheel slip as a function, most preferably an exponential function, relating the magnitude of the wheel slip to the desired magnitude or rate of change in regenerative braking torque (and/or duration thereof). In another preferred embodiment, the relationship between the desired magnitude or rate of change in regenerative braking torque and/or duration thereof and the magnitude of the wheel slip are generated via one or more look-up tables relating these parameter to one another, such as the look-up table 132 stored in the memory 122 of FIG. 1.

In certain embodiments, the desired change in the magnitude or rate of regenerative braking torque or duration thereof are larger if the wheel slip is detected on the rear wheels of the vehicle or if the magnitude of the wheel slip is relatively large on the rear wheels. In addition, in certain embodiments, the braking request of step 201 and the current regenerative braking torque value of step 214 also have an effect on the desired magnitude or rate of change in regenerative braking torque and/or duration thereof.

In addition, in certain embodiments, a desired magnitude or rate of change of friction braking torque is also determined (step 222). Also in certain embodiments, a duration of the desired magnitude or rate of change of friction braking torque is also determined (step 224). In a preferred embodiment, during steps 222 and 224, the desired magnitude or rate of change of the friction braking torque (and/or the duration thereof) are determined by the processor 120 of FIG. 1 with respect to braking torque for or braking pressure applied to the brake units 109 of the friction braking component 105 of FIG. 1 via the first axle 140 of FIG. 1.

In one preferred embodiment, the desired magnitude or rate of change of friction braking torque of step 222 is inversely related to the desired magnitude or rate of change of regenerative braking torque of step 218, for example via a one to one ratio via another look-up table 132 stored in the memory 122 of FIG. 1 or a linear function relating the desired magnitude or rate of change of friction braking torque to the desired magnitude or rate of change of regenerative braking torque. However, this may vary in other embodiments.

Also in a preferred embodiment, the duration of the desired magnitude or rate of change of friction braking torque of step 224 is inversely related to the duration of the desired magnitude or rate of change of regenerative braking torque of step 220, for example via a one to one ratio via another look-up table 132 stored in the memory 122 of FIG. 1 or a linear function relating the duration of the desired magnitude or rate of change of friction braking torque to the duration of the desired magnitude or rate of change of regenerative braking torque. However, this may also vary in other embodiments.

Next, the regenerative braking torque is modulated (step 226). In a preferred embodiment, the regenerative braking torque is modulated by adjusting, via instructions from the processor 120 of FIG. 1, the braking torque for or braking pressure applied to the brake units 109 of the regenerative braking component 106 of FIG. 1 via the second axle 142 of FIG. 1 in order to implement the desired magnitude or rate of change of the regenerative braking torque of step 218 and/or the duration thereof of step 220.

In addition, in certain embodiments, the friction braking torque is also modulated (step 228). In a preferred embodiment, the friction braking torque is modulated by adjusting, via instructions from the processor 120 of FIG. 1, the braking torque for or braking pressure applied to the brake units 109 of the friction braking component 105 of FIG. 1 via the first axle 140 of FIG. 1 in order to implement the desired magnitude or rate of change of the friction braking torque of step 222 and/or the duration thereof of step 224.

In a preferred embodiment, the process 200 then returns to step 201, described above. Steps 201-228 (or an applicable subset thereof, as may be appropriate in certain embodiments) preferably repeat so long as the vehicle is being operated and/or so long as wheel slip is detected.

Accordingly, improved methods and systems are provided for controlling braking and adjusting braking torque for braking systems of vehicles, such as automobiles. The improved methods and systems provide for modulation of regenerative braking torque based on a magnitude of wheel slip, rather than requiring regenerative braking to be completely on or off as in conventional systems. In certain embodiments, the modulation is also dependent on a location of the wheels having the wheel slip, among other possible variables. In addition, in certain embodiments, the improved methods and systems further provide for modulation of friction braking torque based either directly or indirectly on the magnitude of the wheel slip, among other possible variables.

It will be appreciated that the disclosed methods and systems may vary from those depicted in the Figures and described herein. For example, as mentioned above, the controller 104 of FIG. 1 may be disposed in whole or in part in any one or more of a number of different vehicle units, devices, and/or systems. In addition, it will be appreciated that certain steps of the process 200 may vary from those depicted in FIG. 2 and/or described herein in connection therewith. It will similarly be appreciated that certain steps of the process 200 may occur simultaneously or in a different order than that depicted in FIG. 2 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles, and in controlling any one or more of a number of different types of vehicle infotainment systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for adjusting braking in a vehicle having wheels and a regenerative braking system, the method comprising the steps of:
providing regenerative braking torque for the vehicle via the regenerative braking system, via instructions provided by a processor, at a first level if a wheel slip of the vehicle is not present; and
providing regenerative braking torque for the vehicle via the regenerative braking system, via instructions provided by the processor, at one of a plurality of modulated levels if the wheel slip is present, each of the plurality of modulated levels being dependent on a location of the wheel slip, each of the plurality of modulated levels being less than the first level.

2. The method of claim 1, wherein the step of providing regenerative braking torque comprises the steps of:
reducing regenerative braking torque for the vehicle via the regenerative braking system at a first rate if the wheel slip is present and the magnitude of the wheel slip is less than a predetermined threshold; and
reducing regenerative braking torque for the vehicle via the regenerative braking system at a second rate if the wheel slip is present and the magnitude of the wheel slip is greater than the predetermined threshold, the second rate being greater than the first rate.

3. The method of claim 1, wherein the step of providing regenerative braking torque comprises the steps of:
reducing regenerative braking torque for the vehicle via the regenerative braking system for a first amount of time if the wheel slip is present and the magnitude of the wheel slip is less than a predetermined threshold; and
reducing regenerative braking torque for the vehicle via the regenerative braking system for a second amount of time if the wheel slip is present and the magnitude of the wheel slip is greater than the predetermined threshold, the second amount of time being greater than the first amount of time.

4. The method of claim 1, wherein the wheels comprise a front wheel and a rear wheel, and the method further comprises the steps of:
measuring vehicle speeds for one or more of the plurality of wheels;
determining whether the wheel slip is present in the front wheel, using the vehicle speeds; and
determining whether the wheel slip is present in the rear wheel, using the vehicle speeds.

5. The method of claim 4, wherein the step of providing regenerative braking torque comprises the steps of:
providing regenerative braking torque for the vehicle via the regenerative braking system at a second level of the plurality of modulated levels if the wheel slip is present in the rear wheel but not in the front wheel; and
providing regenerative braking torque for the vehicle via the regenerative braking system at a third level of the plurality of modulated levels if the wheel slip is present in the front wheel, the third level being greater than the second level.

6. The method of claim 4, wherein the step of providing regenerative braking torque comprises the steps of:
reducing regenerative braking torque for the vehicle via the regenerative braking system at a first rate if the wheel slip is present in the rear wheel but not in the front wheel; and
reducing regenerative braking torque for the vehicle via the regenerative braking system at a second rate if the wheel slip is present in the front wheel, the second rate being greater than the first rate.

7. The method of claim 4, wherein the step of providing regenerative braking torque comprises the steps of:
reducing regenerative braking torque for the vehicle via the regenerative braking system for a first amount of time if the wheel slip is present in the rear wheel but not in the front wheel; and
reducing regenerative braking torque for the vehicle via the regenerative braking system for a second amount of time if the wheel slip is present in the front wheel, the second amount of time being less than the first amount of time.

8. The method of claim 4, wherein the step of providing regenerative braking torque comprises the steps of:
providing regenerative braking torque for the vehicle via the regenerative braking system at a second level of the plurality of modulated levels if the wheel slip is present in the rear wheel but not in the front wheel; and
providing regenerative braking torque for the vehicle via the regenerative braking system at a third level of the plurality of modulated levels if the wheel slip is present in the rear wheel but not in the front wheel, the third level being greater than the second level.

9. A method for adjusting braking in a vehicle having wheels and a regenerative braking system, the method comprising the steps of:
reducing regenerative braking torque for the vehicle via the regenerative braking system, via instructions provided by a processor, at a first rate of reduction if a wheel slip of the vehicle is present and a magnitude of the wheel slip is less than a predetermined threshold; and
reducing regenerative braking torque for the vehicle via the regenerative braking system, via instructions provided by the processor, at a second rate of reduction if the wheel slip is present and the magnitude of the wheel slip is greater than the predetermined threshold, the second rate being greater than the first rate.

10. The method of claim 9, wherein the wheels comprise a front wheel and a rear wheel, and the method further comprises the steps of:
measuring vehicle speeds for one or more of the plurality of wheels; and
determining whether the wheel slip is present in the front wheel using the vehicle speeds, wherein the step of reducing regenerative braking torque for the vehicle at the second rate of reduction further comprises the step of reducing regenerative braking torque for the vehicle via the regenerative braking system at the second rate of reduction on the further condition that the wheel slip is detected in the rear wheel.

11. The method of claim 9, wherein the vehicle also has a friction braking system, and the method further comprises the steps of:
- increasing friction braking torque for the vehicle via the friction braking system at a first rate of increase if the wheel slip is present and the magnitude of the wheel slip is less than the first predetermined threshold; and
- increasing friction braking torque for the vehicle via the friction braking system at a second rate of increase if the wheel slip is present and the magnitude of the wheel slip is greater than the first predetermined threshold, the second rate being greater than the first rate.

12. A system for adjusting braking in a vehicle having a plurality of wheels and a regenerative braking system, the system comprising:
- one or more sensors configured to measure wheel speeds from one or more of the plurality of wheels; and
- a processor coupled to the one or more sensors and configured to:
  - determine whether and where wheel slip is present using the wheel speeds; and
  - cause the regenerative braking system to provide regenerative braking torque for the vehicle:
    - at a first level if the wheel slip is not present; and
    - at one of a plurality of modulated levels if the wheel slip is present, each of the plurality of modulated levels being dependent on a location of the wheel slip, each of the plurality of modulated levels being less than the first level.

13. The system of claim 12, wherein the processor is further configured to:
- calculate the magnitude of the wheel slip if the wheel slip is present; and
- cause the regenerative braking system to reduce regenerative braking torque for the vehicle:
  - at a first rate if the wheel slip is present and the magnitude of the wheel slip is less than a predetermined threshold; and
  - at a second rate if the wheel slip is present and the magnitude of the wheel slip is greater than the predetermined threshold, the second rate being greater than the first rate.

14. The system of claim 12, wherein the processor is further configured to:
- calculate the magnitude of the wheel slip if the wheel slip is present; and
- cause the regenerative braking system to reduce regenerative braking torque for the vehicle for:
  - a first amount of time if the wheel slip is present and the magnitude of the wheel slip is less than a predetermined threshold; and
  - a second amount of time if the wheel slip is present and the magnitude of the wheel slip is greater than the predetermined threshold, the second amount of time being greater than the first amount of time.

15. The system of claim 12, wherein the plurality of wheels comprises a front wheel and a rear wheel, and the processor is further configured to:
- determine whether the wheel slip is present in the front wheel using the wheel speeds;
- determine whether the wheel slip is present in the rear wheel using the wheel speeds; and
- cause the regenerative braking system to provide regenerative braking torque for the vehicle:
  - at a second level of the plurality of modulated levels if the wheel slip is present in the rear wheel but not in the front wheel; and
  - at a third level of the plurality of modulated levels if the wheel slip is present in the front wheel, the third level being greater than the second level.

16. The system of claim 12, wherein the plurality of wheels comprises a front wheel and a rear wheel, and the processor is further configured to:
- determine whether the wheel slip is present in the front wheel using the wheel speeds;
- determine whether the wheel slip is present in the rear wheel using the wheel speeds; and
- cause the regenerative braking system to reduce regenerative braking torque for the vehicle:
  - at a first rate if the wheel slip is present in the rear wheel but not in the front wheel; and
  - at a second rate if the wheel slip is present in the front wheel, the second rate being less than the first rate.

17. The system of claim 12, wherein the plurality of wheels comprises a front wheel and a rear wheel, and the processor is further configured to:
- determine whether the wheel slip is present in the front wheel using the wheel speeds;
- determine whether the wheel slip is present in the rear wheel using the wheel speeds; and
- cause the regenerative braking system to reduce regenerative braking torque for the vehicle for:
  - a first amount of time if the wheel slip is present in the rear wheel but not in the front wheel; and
  - a second amount of time if the wheel slip is present in the front wheel, the second amount of time being less than the first amount of time.

18. The system of claim 12, wherein the plurality of wheels comprises a front wheel and a rear wheel, and the processor is further configured to:
- determine whether the wheel slip is present in the front wheel using the wheel speeds;
- determine whether the wheel slip is present in the rear wheel using the wheel speeds; and
- cause the regenerative braking system to provide regenerative braking torque for the vehicle:
  - at a second level of the plurality of modulated levels if the wheel slip is present in the rear wheel but not in the front wheel; and
  - at a third level of the plurality of modulated levels if the wheel slip is present in the rear wheel but not in the front wheel, the third level being less than the second level.

* * * * *